Feb. 7, 1939.                A. MASKI                2,146,125
                      BRACELET FASTENING DEVICE
                         Filed Aug. 5, 1936
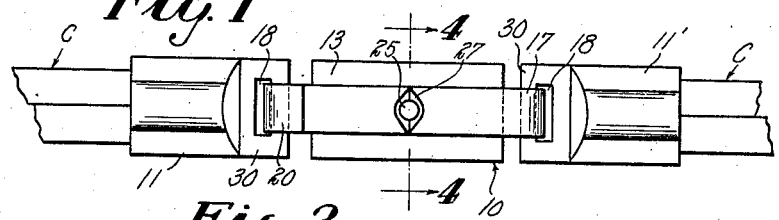
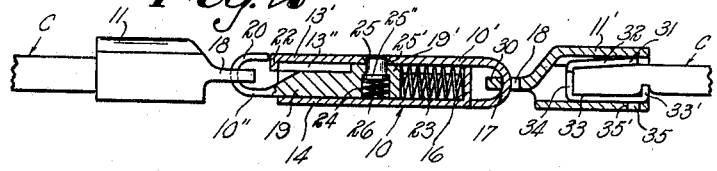
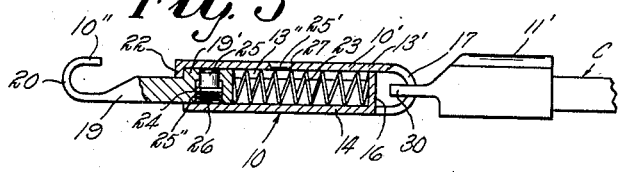
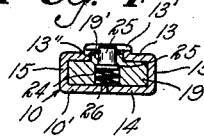     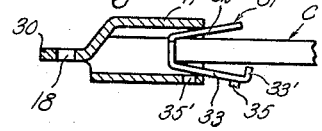
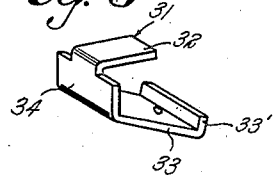
Inventor
ANDREW MASKI
By *W. Clay Lindsay*
                        Attorney Patented Feb. 7, 1939

2,146,125

UNITED STATES PATENT OFFICE 2,146,125

BRACELET FASTENING DEVICE

Andrew Maski, Hartford, Conn.

Application August 5, 1936, Serial No. 94,324

1 Claim. (Cl. 24—239)

This invention relates to a bracelet fastening device and has for its principal aim the provision of an expansible and detachable fastening means arranged to removably secure the ends of a bracelet together in such a manner that the bracelet may be positioned upon an arm with greatest facility and may be expanded beyond its normal size during application and removal of the bracelet.

It is a further object of my invention to provide a simply constructed, neat appearing, expansible fastening device for a flexible bracelet which is so constructed that the parts of the device may be securely fastened together without of themselves tending to become disengaged, and the parts may be quickly and easily uncoupled by the wearer.

This invention further contemplates the provision of bracelet connectors adapted to receive and removably clamp against the ends of a cord or other flexible member forming part of the bracelet.

It is a still further object of this invention to provide a bracelet fastening device which will automatically open to an expanded position for detachable engagement with one of the bracelet ends upon the depression of a member in the fastening device.

With these and other objects in view, my invention resides in the unique construction and combination of members hereinafter fully described, illustrated in the accompanying drawing, and referred to in the claims appended hereto; it being understood, of course, that various changes in the general form, proportion, and size, as well as other minor details of construction lying within the scope of the claims, may be resorted to without departing from the spirit of the invention or sacrificing any of its advantages thereof.

In the accompanying drawing illustrating one embodiment which my invention may take and wherein like parts are indicated by like numerals:

Figure 1 is a plan view of my fastening device in closed position;

Fig. 2 is a side elevation of my device taken partly in longitudinal section and showing the parts in closed position;

Fig. 3 is a view similar to Fig. 2 with the device in detached open position;

Fig. 4 is a sectional view taken substantially along the line 4—4 of Fig. 1;

Fig. 5 is a longitudinal section through one of the cord connectors with the cord clamping member in position to be inserted within the connector to lock the cord therein; and Fig. 6 is a perspective view illustrating the cord clamping member.

In accordance with the present invention, I have provided a bracelet fastening device including a clasp 10 removably and pivotally interconnecting a pair of similar cord engaging connectors 11 and 11'. The clasp is provided with a hollow casing 10' preferably bent to an elongated tubular shape from a suitable sheet metal strip and slidably supporting a movable hook member 10". In the present instance, the casing is rectangular in cross section and has opposed top and bottom walls 13 and 14 and opposed side walls 15. As shown in Fig. 4, the strip may be bent so that its side edges are in abutting engagement to form the bottom wall 14, and the top wall may be provided with an elongated humped portion 13'. The right-hand end of bottom wall 14, as viewed in Figs. 2 and 3, has adjacent extended portions bent transversely of the casing towards top wall 13 to cooperatively provide an end wall 16. A tongue 17, longitudinally projecting from the top wall above end wall 16, is bent back towards the end wall to provide a substantially closed eye pivotally engaged within the closed eye 18 of connector 11'.

The movable hook member 10" is provided with an elongated body portion 19 substantially rectangular in cross section and longitudinally slidable within casing 10'. It is not desired to limit my invention to rectangular shaped, relatively slidable members 10' and 10" since the casing and cooperating body portion 19 may be of any suitable cross sectional contour which permits a relative longitudinally slidable movement and prevents relative rotation. It will also be appreciated that members 10' and 19 need not be generally longitudinally straight as illustrated, but may be of correspondingly longitudinal arcuate contours to conform with the curvature of a wrist and still have the required longitudinally slidable relation. The outer end of body portion 19 is reduced in thickness and rolled back towards itself to provide an open end hook 20 which may be removably and pivotally received within the closed eye 18 of connector 11.

The body portion 19 which is slidably mounted within the casing also has an upwardly projecting rectangular boss 19' on its rearward end slidably received in a longitudinal groove 13" formed in the under side of wall 13 by hump 13'. This boss provides additional thickness to part of the body portion 19 so that a locking device may be received therein and yet the clasp 10 may be maintained relatively thin and of neat appearance. Boss 19' is adapted to abut against a downwardly depending lug 22 formed by a tongue portion bent over at the left-hand end of top wall 13', as viewed in Figs. 2 and 3, and serving to limit the extent of outward movement of the hook member 10", thus preventing it from being completely withdrawn from the casing.

A coiled spring 23 slidably received within casing 10' is compressively engaged between the inner end of the hook member and end wall 16, tending to resiliently urge the hook member to its outermost or open position, as shown in Fig. 3. It will be appreciated that when the clasp is in this open position, the bracelet is lengthened, thus relieving any previous tension it may have had about a wearer's wrist and facilitating attachment and detachment of connector 11.

To close the clasp, the hook member is slidably moved into the casing until the open end of hook 20 substantially abuts against depending lug 22, forming a closed eye at the end of the casing, as shown in Fig. 2, and a lock device automatically secures the parts in closed position with the clasp shortened, thus reducing the bracelet to desired size. Body portion 19 has a counterbored hole 24 extending therethrough with the reduced portion of the hole in boss 19'. The opposite ends of this hole are located adjacent walls 13 and 14, and a plunger 25 slidably mounted in the hole is urged by a coiled spring 26 within the counterbored portion into frictional engagement with top wall 13. A bore 25' through top wall 13' is arranged to slidably receive plunger 25 when the clasp is in closed position.

In view of the fact that spring 26 is compressed between the bottom of plunger 25 and the bottom wall of the casing, it will be appreciated that it is simply necessary to push the clasp to a closed position whereupon plunger 25 will be resiliently urged into locking engagement. The bottom of plunger 25 terminates in an annular flange 25" slidably received in the counterbored portion of hole 24 and limiting the extent of upward movement of the plunger so that it may not be completely forced out of the casing, and the length of the plunger is preferably so chosen that the top thereof will not extend above the general top surface of humped portion 13' and permit the plunger to become easily depressed and disengaged from locked position in the casing. It will be evident that when the plunger is depressed, spring 23 will immediately act to shift the clasp to open position. To facilitate disengaging the plunger from locked position, I preferably provide a somewhat V-shaped groove 27 extending transversely across the top casing wall and across bore 25' so that a fingernail may be easily pressed against plunger 25 to unlock the clasp.

Cord engaging connectors 11 and 11', which may be of duplicate construction, are of a tubular contour in general conformity with the cross section of the clasp. Each connector terminates at one end in a downwardly and rearwardly extending wall 30 having the hole 18 therein suitably positioned for respective engagement with hooks 17 and 20. A somewhat resilient clip member 31, having respective top and bottom walls 32 and 33 interconnected by an end wall 34, is adapted to slidably and resiliently interlock within the open end of each connector. The top and bottom walls 32 and 33 tend to spring away from each other into resilient engagement with the inner walls of each connector, and the forward end of bottom wall 33 terminates in an upwardly projecting shoulder 33' adapted to clamp into tight engagement with the flexible cord or strap members C, as shown in Fig. 2, when clip 31 is received in a connector. Top wall 32 is preferably considerably narrower and cenerally disposed above wall 32 so that when two cord ends are engaged within each clip, as illustrated in the present instance, the cords will be deformed into clamping position and tightly held within connector 11. A depending lug 35 projects downwardly from the forward end of member 31 and is adapted to snap into engagement with a hole 35' provided in the bottom connector wall, as shown. When the cords or strap members C become worn out, it will be appreciated that a small instrument, such as the point of a lead pencil, may be inserted through hole 35' to depress lug 35 and disengage it therefrom, whereupon cords C and member 31 may be withdrawn from connectors 11.

I claim as my invention:

A bracelet fastening device having a preformed sheet metal casing provided with an open end and a closed end, said closed end of the casing having a rearwardly extending looped portion forming a closed eye, a member longitudinally slidable within the casing and terminating at its outer extended end in an open hook, a boss on the rearward portion of said member and within the casing, a depending lug on the forward end of the casing engageable with said boss and limiting the extent of movement of said member out of the casing, the slidable member being movable into the casing sufficiently to close the hook with the end of the casing, a spring pressed plunger slidably mounted for transverse movement within said member and through said boss, said casing having an aperture adapted to receive the plunger when the hook is in closed position, and a coiled spring compressively received between the casing and the end of said member to resiliently urge the hook to an open position when the plunger is disengaged from the casing aperture.

ANDREW MASKI.